United States Patent
Puniello

[19]

[11] Patent Number: 6,129,881
[45] Date of Patent: Oct. 10, 2000

[54] RETRACTABLE SLEEVE FOR INJECTION MOLDING

[75] Inventor: Paul A. Puniello, Bristol, R.I.

[73] Assignee: Acushnet Company, Fairhaven, Mass.

[21] Appl. No.: 09/294,083

[22] Filed: Apr. 19, 1999

[51] Int. Cl.$^7$ .................................................. B29C 45/14
[52] U.S. Cl. ...................... 264/278; 264/279.1; 264/334; 264/102; 425/116; 425/125; 425/556; 425/577; 425/812
[58] Field of Search .................................. 264/278, 279.1, 264/328.12, 102, 334; 425/116, 120, 125, 129.1, 573, 577, 556, 812

[56] References Cited

U.S. PATENT DOCUMENTS

| | | | |
|---|---|---|---|
| 3,068,522 | 12/1962 | Nickerson et al. | 425/116 |
| 4,389,365 | 6/1983 | Kudriavetz | 264/297.8 |
| 4,894,958 | 1/1990 | Takasaki | 425/806 |
| 5,783,293 | 7/1998 | Lammi | 428/212 |
| 5,849,237 | 12/1998 | Inoue | 425/556 |

FOREIGN PATENT DOCUMENTS 8-323772  12/1996  Japan .

Primary Examiner—Robert Davis
Attorney, Agent, or Firm—Pennie & Edmonds LLP

[57] ABSTRACT

The present invention is directed to a retractable sleeve for a golf ball injection mold for forming a golf ball cover or intermediate layers of a golf ball. The retractable sleeves engage with a golf ball core to securely position the core within the injection mold and may be used to strike the golf ball out of the mold cavity after the injection molding process is completed. The faces of the retractable sleeves may be shaped to conform to the curvature and texture of the cavity wall of the golf ball mold.

19 Claims, 4 Drawing Sheets

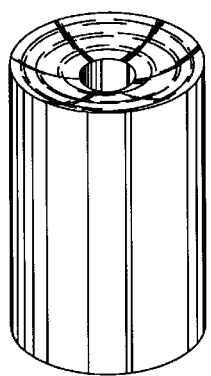 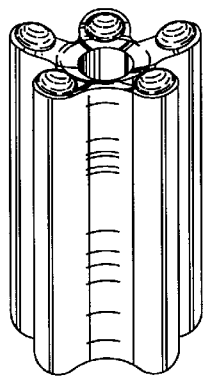 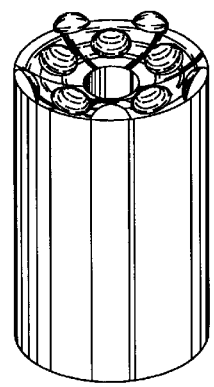
Fig. 7a  Fig. 7b  Fig. 7c
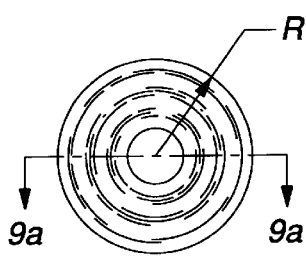 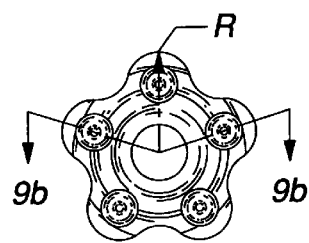 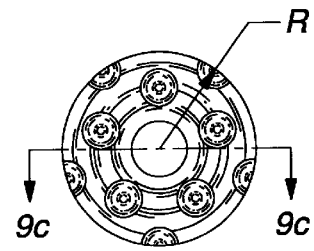
Fig. 8a  Fig. 8b  Fig. 8c
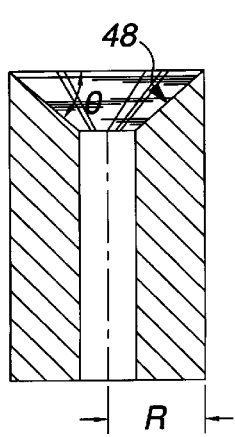 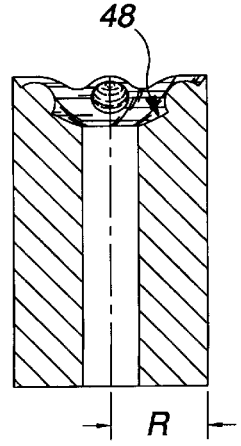 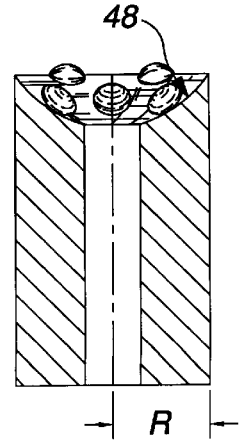
Fig. 9a  Fig. 9b  Fig. 9c

RETRACTABLE SLEEVE FOR INJECTION MOLDING

FIELD OF INVENTION

The present invention is directed to a retractable sleeve for a golf ball injection mold, wherein the retractable sleeve may be used to fabricate a golf ball cover or intermediate layer with improved durability in a high volume production environment.

BACKGROUND OF THE INVENTION

It is standard practice in the fabrication of an intermediate layer or cover layer of a golf ball to utilize an injection mold having two mold plates with hemispherical cavities that mate to form a spherical shape when the mold halves are joined. At the initial stage of the injection molding process, a golf ball core is supported centrally within the mold by a plurality of retractable pins near the upper and lower poles of the mold cavity so as to leave a space for forming an intermediate or cover layer about the core. A thermoplastic or thermosetting material then it injected into the mold cavity near the equator of the mold cavity. The retractable pins hold the core in place while the thermoplastic or thermosetting material injected into the mold cavity fills the void between the golf ball core and the mold. Once the void is nearly filled but before the injected material has completely hardened, the centering pins holding the core in place retract into pin holes and the injected material fills the voids left by the pins. The injected material then cools and hardens to form an intermediate layer or cover of the golf ball.

The retractable pins in conventional injection molding are tightly engaged with the golf ball core initially to center the core within the mold and subsequently to maintain the core's position during the injection molding process. For instance, injection of thermoplastic or thermosetting material into the mold cavity through a plurality of edge gates can cause significant uneven pressure of the core of the ball, particularly during the early stages of the injection process when the core is only minimally covered by injected material. The retractable pins counteract the unbalanced forces on the core to maintain the core's desired position. The core becomes held more securely in place by the injected material as the material fills the mold and surrounds the core and the pins. Once the core is sufficiently covered by injected material, the pins can be disengaged from the core while the injected material is still moldable and any remaining voids in the mold are filled by the injected material without affecting the position of the core. All trapped air and gasses evacuate the cavity via the retractable pins and vent pins located near the upper and lower poles of the mold cavity. Once the injected material has cooled sufficiently, the mold cavity is opened and the ball is ejected from the mold by striking the pins against the ball.

Use of a plurality of retractable pins to securely position the golf ball core during the injection process is known to cause wear at the interface between the surfaces of the pins and the surfaces of the pin holes in the mold plate through which the pins are inserted into the mold cavity. Typically, the face of the pins that contact the core of the ball are not normal, i.e. perpendicular, to the direction of the axial force applied to the pins to cause them to engage with the core. In a conventional retractable pin golf ball injection mold, illustrated in FIGS. 1 and 2, the pins are engaged with the core by being inserted into the mold in a vertical plane. The faces of the pins, however, are angled so that the they contact the core essentially along a tangent to the surface of the ball.

For forming intermediate layers, the faces of pins that contact the ball typically have approximately a 20 degree angle cut, whereas the tips of pins in an injection mold to form a cover layer have an angle with dimple radius formed on the end thereof. The faces of the pins also may be machined to match the curvature of the spherical mold cavity.

Because the faces of the pins in contact with the ball are not normal to the direction of the vertical axial force applied to the pins engage them with the core, the core of the ball applies a counterbalancing force on the pins that has axial load and a cantilever load. As the pins move under this cantilever load when engaging or disengaging from the ball, the pin holes are worn out of round and the pins may experience extensive wear. In some instances, galling of the pin and pin hole may result. Wear between the pins and pin holes eventually becomes excessive and allows injected material to flow into the worn area, causing undesirable flash on the surface of the molded layer of the ball. The result of this undesired wear is that the manufactured balls require additional process steps to remove the flash and the mold must be shut down periodically for inspection, repair and/or replacement of worn tooling.

A second problem associated with the use of multiple pins to position the ball in the mold cavity is that injected material may engulf the pins before they are disengaged, thereby leaving voids of trapped air and other gasses in the locations where the pins contact the core of the ball. While the pin holes may be used to vent these trapped gasses, it is desirable to evacuate trapped air and gasses through vent pins located at or near the poles of the mold cavity. In addition, injected material that contacts the retractable pins immediately cools, which in turn slows the progression of covering material and causes the flow terminus to not meet at the poles of the ball where vent pins typically are located.

Another problem that results from use of multiple pins occurs during ejection of the ball from the mold. After the injected material has filled the mold cavity and has sufficiently hardened, the mold is opened and the ball is ejected from the mold by striking the pins against the surface of the ball. Because the faces of the pins comprise a small surface area, the impact force needed to eject the ball from the mold can impart high stress loads upon the molded layer. These high impact forces may weaken or cosmetically damage the molded layer, thereby diminishing the performance or durability of the ball, or cause the molded layer to become deformed, crack or tear.

Thus, it is desirable to substitute the multiple pins used in conventional golf ball injection molding with a device that permits proper positioning of the core without the associated problems of wear, having improved venting of trapped gasses, and reducing stresses imparted to the molded layer upon ejection from the mold.

SUMMARY OF THE INVENTION

The present invention is directed to replacing multiple retractable pins found in conventional golf ball injection molds with retractable sleeves for positioning and ejecting the ball. By the present invention, it is believed that the problems associated with use of a plurality of retractable pins can be avoided or prevented by employing a retractable sleeve.

Specifically, use of a retractable sleeve will decrease the amount of additional processing to remove flash from the balls and reduce or eliminate downtime for inspection, repair or replacement of injection mold tooling because the cantilever loads typically imparted on retractable pins when engaged with the ball will be translated to hoop stresses when a retractable sleeve is used. Furthermore, a retractable sleeve will facilitate improved venting because trapped air and gases in the mold cavity will escape through vent pins at the poles of the mold cavity.

In addition, use of a retractable sleeve will improve the durability of the molded layer as well as decrease deformation, cracking or tearing of the molded surface because the sleeve will distribute the impact force applied to the ball during ejection from the mold over a significantly greater surface area than that struck by the faces of multiple pins. Because the retractable sleeve distributes the impact force over a greater surface area, the sleeve imparts decreased stresses to the molded ball and results in reduced deformation of the molded surface upon ejection, thereby improving the durability of the ball in a high volume production environment. Use of a retractable sleeve also will increase manufacturing capacity because the distribution of impact force over a greater area will permit the balls to be ejected from the mold after a shorter cooling period without damaging the molded layer than would be possible with retractable pins.

One embodiment of the invention includes two mold plates, each having cavities with substantially hemispherical inner surfaces that when joined form a substantially spherical mold cavity, and at least two retractable sleeves that extend from the inner surface of the mold cavity to the outer surface of the golf ball core. In another embodiment, the retractable sleeves are located near the upper and lower poles of the spherical mold cavity. Another embodiment further includes vent pins located near the upper and lower poles of the mold cavity that are surrounded by retractable sleeves.

One embodiment includes that the spherical mold cavity by textured to form a negative dimple pattern with multiple protrusions that form dimples in a finished golf ball cover. Another embodiment further includes that the retractable sleeves and vent pins also are textured to form a negative dimple pattern in conformance with the negative dimple pattern formed on the spherical cavity wall. Another embodiment includes that the perimeter of the retractable sleeve does not intersect with a dimple.

In one embodiment the retractable sleeves are shaped so that they securely position the golf ball core when engaged but also conform to the curvature and texture of the spherical cavity wall when disengaged. In another embodiment, the retractable sleeves have a profile angle between about 10 to about 30 degrees. In yet another embodiment, the retractable sleeves have a profile angle of about 20 degrees. On embodiment includes that the distance from the center of the retractable sleeve to its outermost edge be from about 15 percent of the diameter of the ball to about half of the diameter of the ball. Another embodiment includes that the distance from the center of the retractable sleeve to its outermost edge is about 35 percent of the diameter of the ball. In addition, one embodiment further includes that the retractable sleeves have an approximately circular cross sectional shape.

The present invention also is directed to a method of manufacturing a golf ball layer utilizing a retractable sleeve to hold the ball core in place. In one embodiment, a ball core is placed into a golf ball mold, at least two retractable sleeves engage with the core to securely position it in place, and layer material is injected into the mold cavity about the core. In another embodiment, the retractable sleeves disengage from the golf ball core prior to being contacted by the injected layer material. Another embodiment includes that the injected material fully surrounds the retractable sleeves before the retractable sleeves are disengaged from the golf ball core.

In one embodiment, trapped air and gases within the golf ball mold cavity are vented through vent pins within the retractable sleeves. In another embodiment, the golf ball core is securely positioned within the mood cavity before injected material enters the golf ball mold cavity. One embodiment also includes that the golf ball core is centrally positioned within the mold cavity, while another embodiment furhter includes an additional step of ejecting the golf ball from the mold by striking the ball with at least one retractable sleeve after the injected material has at least partially hardened. Finally, in one embodiment the golf ball is ejected from the mold after the injected material has substantially hardened.

BRIEF DESCRIPTION OF THE FIGURES

FIGS. 7A–C are isometric views of retractable sleeves in accordance with the present invention.

FIGS. 8A–C are top views of retractable sleeves in accordance with the present invention.

FIGS. 9A–C are cross-sectioned side views of retractable sleeves in accordance with the present invention.

DETAILED DESCRIPTION OF THE INVENTION

Figure 1:
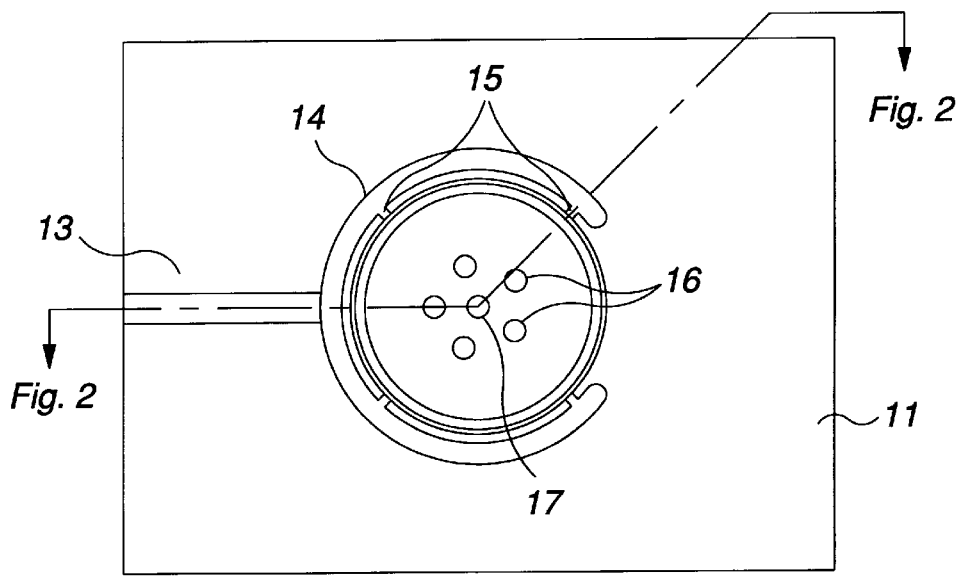
FIG. 1 is a top view of one section of a golf ball injection mold with multiple retractable pins.
Figure 2:
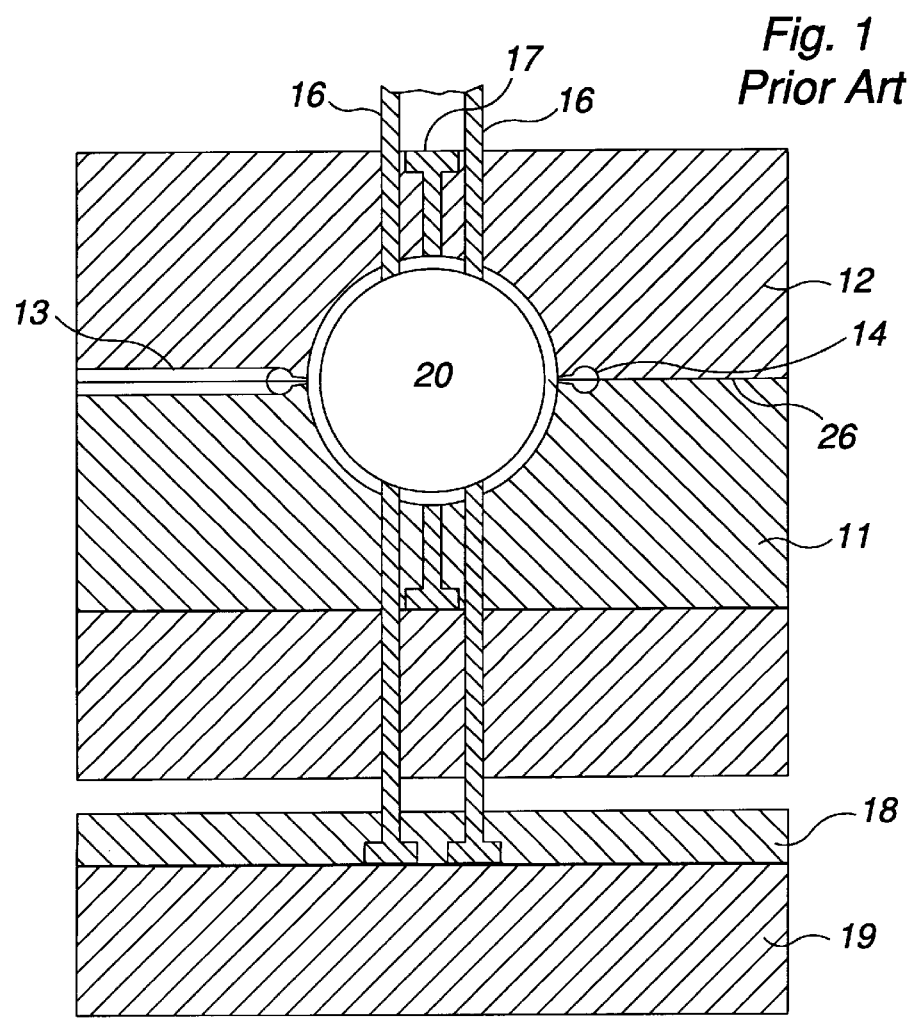
FIG. 2 is a cross-sectioned side view of a golf ball injection mold with multiple retractable pins.
Figure 3:
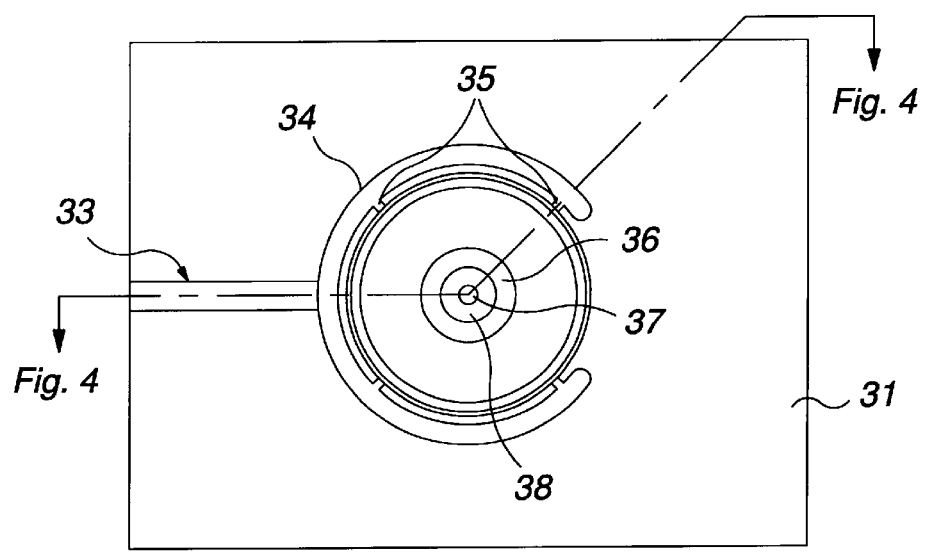
FIG. 3 is a top view of one section of a golf ball injection mold with a retractable sleeve, a core pin and a vent pin.
Figure 4:
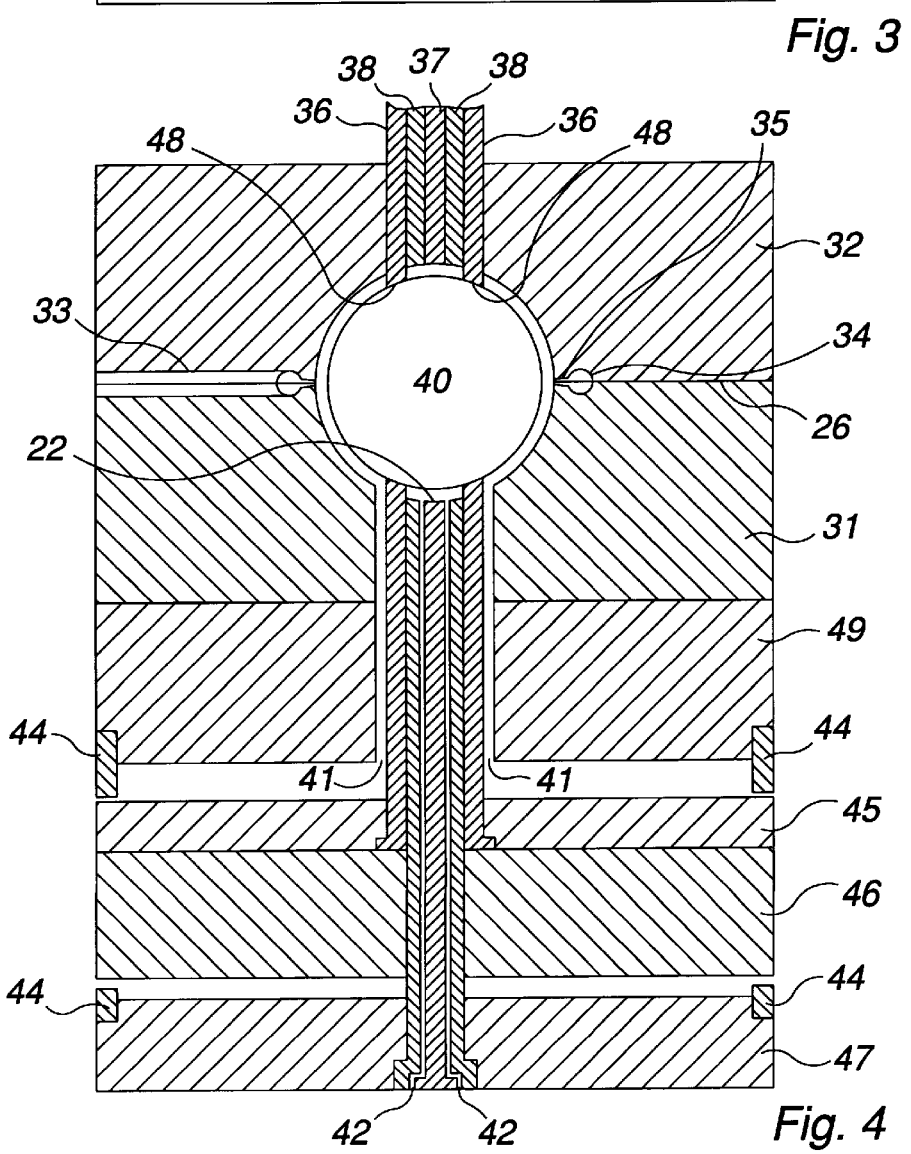
FIG. 4 is a cross-sectioned side view of a golf ball injection mold with retractable sleeves in the engaged position, core pins and vent pins.
Figure 5:
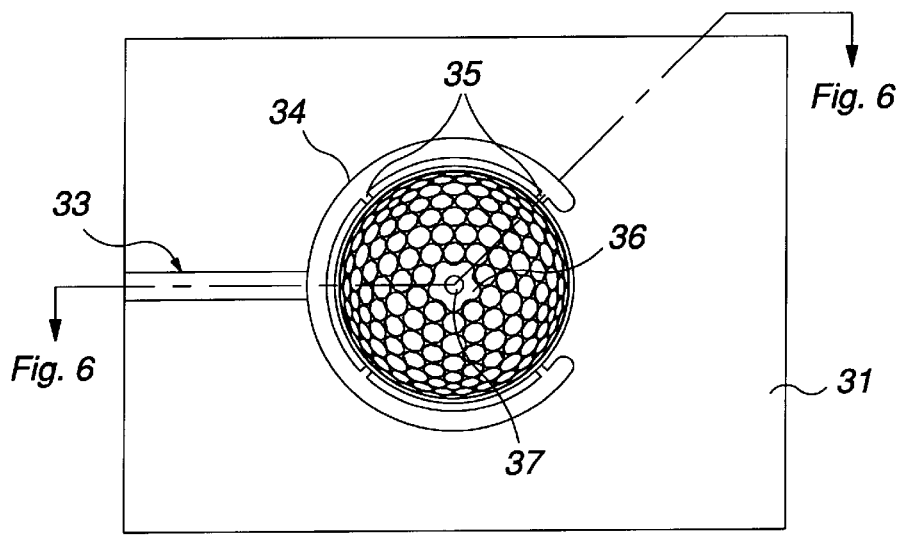
FIG. 5 is a top view of one section of a golf ball injection mold with a retractable sleeve and a vent pin.

Referring to FIGS. 3 and 4, a substantially spherical golf ball core 40, the properties of which and process by which it is formed not being critical to the present invention, is placed into a mold. The mold includes opposing mold portions defined by two mold halves 31 and 32. Each mold half, in turn, defines a corresponding substantially hemispherical cavity and has a mating surface surrounding the hemispherical cavity and facing the opposing mold half. When the mold halves are brought together in proper registration at a parting line 26, with the mating surfaces in full contact with each other, the two hemispherical cavities together define a substantially spherical mold cavity having one or more gates 35 for injecting material for forming a cover layer or intermediate layer of a golf ball. Inner surfaces of the mold halves defining the mold cavity, may be smooth or textured according to the desired texture of the surface of the ball layer formed. When forming a cover layer for a golf ball, it is preferred that the inner surfaces of the mold halves defining the mold cavity be textured to form a negative dimple pattern with a plurality of protrusions that form dimples in the finished golf ball cover.

The golf ball core 40 preferably is positioned within the mold cavity so that it is essentially evenly spaced apart from the inner walls of the mold cavity. To maintain the position of the golf ball core in the mold cavity before and during injection of material that will form the cover layer or intermediate layer of the golf ball, the golf ball core is supported within the mold cavity by at least two retractable sleeves 36 that extend from the inner surface of the mold cavity to the outer surface of the golf ball core 40. Although various structures in the invention are described with terms "upper" and "lower", it will be understood that the described orientation is preferred, but the orientation of the structures may be varied without departing from the invention.

In a preferred embodiment, one retractable sleeve 36 is located in each mold half 31 and 32, most preferably disposed near the upper and lower poles of the mold cavity. The retractable sleeves 36 are shown engaged with the golf ball core 40 in FIG. 4 and disengaged in FIG. 6. After the golf ball core 40 is placed within the mold cavity, the retractable sleeves 36 engage with the core of he ball 40 by sliding through an opening 41 in the mold cavities. The mold cavity opening 41 may be honed to allow a retractable sleeve 36 to move freely within it and also to allow trapped air and gasses in the mold cavity to escape during the injection molding process while not permitting substantial material injected into the mold cavity to enter the opening 41 and form a flash on the molded surface of the ball. In order to prevent formation of flash, it is desirable for the width of the opening 41 between the retractable sleeve 36 and the mold cavity wall to be less than about 0.0015 inches, most preferably less than about 0.0005 inches.

Referring to FIGS. 9A–C, the tips 48 of the retractable sleeves 36 that contact the core of the ball 40 may be shaped to securely hold the core in position during the injection molding process as well as to essentially conform to the curvature and texture of the mold cavity wall when disengaged. For retractable sleeves 36 for use in forming intermediate layers of a golf ball, it is preferred that the sleeve tip 48 have a profile angle between about 10 to about 30 degrees, most preferably having a profile angle of about 20 degrees. For retractable sleeves 36 for use in forming cover layers of a golf ball, it is preferred that the sleeve tip 48 be shaped to conform to the radius and negative dimple pattern of the golf ball mold cavity. Referring to FIGS. 8A–C and 9A–C, it is preferred that the distance R from the center of the retractable sleeve 36 to its outermost edge be from about 15 percent of the diameter of the ball with its newly formed layer to about half of the diameter of the ball with its newly formed layer, most preferably being about 35 percent of the diameter of the ball with its newly formed layer.

Figure 6:
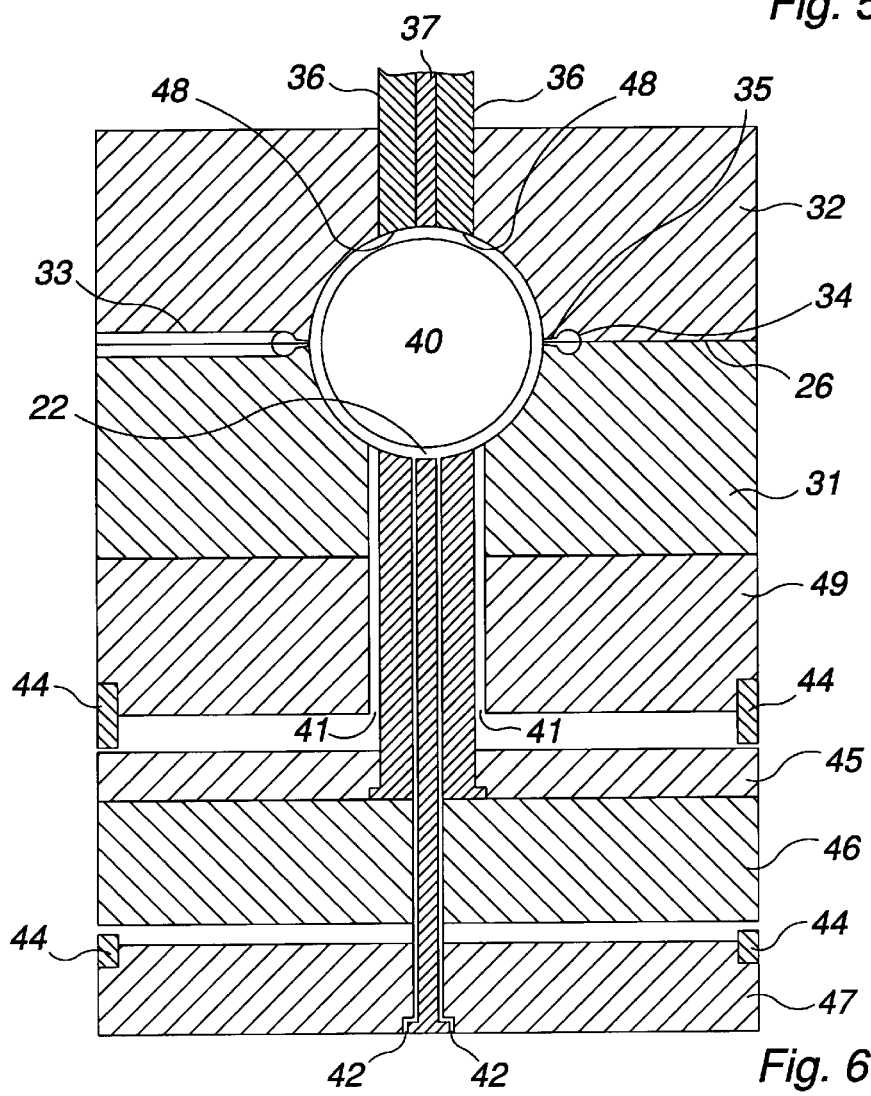
FIG. 6 is a cross-sectioned side view of a golf ball injection mold with retractable sleeves in the disengaged position and vent pins.

In one embodiment, the retractable sleeve 36 is affixed to a retainer bar 45 and ejector bar 46, as shown in FIGS. 4 and 6, which can be activated to cause the retractable sleeve 36 to engage (FIG. 4) or disengage (FIG. 6) from the core of the ball 40, most preferably by operating in a vertical plane. Stops 44 may be provided to control the range of motion of the retractable sleeve.

Referring to FIGS. 8A–C, the perimeter of the tip 48 of the retractable sleeve 36 may be of any desired shape or size. Particularly with respect to forming cover layers of a golf ball, the tip of the retractable sleeve may be determined according to the desired surface texture, i.e., dimple pattern, of the newly formed layer. In such cases, while the perimeter of the tip 48 of the retractable sleeve 36 may intersect one or more dimples formed on the ball cover, as shown in FIG. 8C, it is preferred that the perimeter of the tip not intersect with a dimple formed on the cover of the ball, as shown in FIG. 8B. Forming the perimeter of the tip 48 of the sleeve 36 to not intersect with dimples formed on the cover allows for easier removal of any witness lines that may occur during the injection molding process without adversely affecting the size and shape of the dimples. In one embodiment, retractable sleeves used in the formation of intermediate layers preferably have an essentially circular cross-section, as shown in FIG. 8A. As would be appreciated by one of ordinary skill in the art, however, a retractable sleeve 36 having a different cross-sectional shape may be used, as no particular cross-sectional shape is critical.

As shown in FIGS. 3–6, a primary runner 33, secondary runner 34 and gate system 35 provide material for forming a cover layer or intermediate layer around a ball core 40, although the characteristics or such a runner and gate system are not critical to the present invention. As the void between the golf ball core 40 and inner wall of the mold cavity fills with injected material, trapped air and gasses may escape through openings in the mold cavity 41 through which the retractable sleeves 36 operate. Vent pins 37 also may be provided to further aid in the release of trapped air and gasses within the mold cavity. Furthermore, trapped air and other gasses may be substantially evacuated from the mold cavity prior to or during the injection of material by subjecting the mold to a vacuum.

In the preferred embodiment having two retractable sleeves 36 located near the upper and lower poles of the mold cavity, it is preferred that a vent pin 37 be disposed within an inner cavity of each retractable sleeve 36, most preferably allowing venting to occur approximately at the upper and lower poles of the mold cavity so that the vent pins 37 form the poles of the ball and permit the retractable sleeve 36 to slide over them when actuated without permitting injected material to form a flash on the molded surface of the ball. The vent pin 37 and inner cavity of the retractable sleeve 36 may be honed to permit the sleeve to move freely across the vent pin 3, while not permitting material injected into the mold cavity to enter the opening and form a flash on the molded surface of the ball. The diameter of the vent pin 37 is slightly smaller than the diameter of the inner cavity of the retractable sleeve 36, providing a vent defined by a gap 42 of preferably about 0.0002 to about 0.0008 inches formed between the vent pins and the inner cavity, more preferably about 0.0003 to about 0.0005 inches. In addition, the vent pin 37 may have a flattened side through which trapped air and gasses may escape from the mold while permitting a relatively small amount of flash to form on the molded surface of the ball. Referring to FIGS. 3 and 4, a core pin 38 may be positioned between the vent pin 37 and the inner cavity wall of the retractable sleeve 36 if the distance between the vent pin and retractable sleeve would otherwise result in excessive flash of injected material.

In the preferred embodiment, a vent pin 37 extends through each mold half 31 and 32 to communicate the mold cavity with the exterior for venting trapped air and other gasses from the mold cavity during molding cycles, particularly while the mold is closed. Thus, trapped air and gasses can escape the mold through the vent gap 42 and the opening 41 between the retractable sleeve 36 aid mold plates 31 and 32. When forming a golf ball cover, it is further preferred that the tip 22 of the vent pin 37 be shaped to conform to the golf ball dimple pattern. When forming in intermediate layer, the tip 22 of the vent pin 37 may be cut with the same radius as the remainder of the hemispherical mold plate cavity.

The process for forming a cover or intermediate layer around a golf ball core through use of injection molding using retractable sleeves is similar to that of conventional injection molding using retractable pins. As will become apparent to one of ordinary skill in the art, however, use of retractable sleeves provides manufacturing advantages that cannot be achieved with retractable pins. A golf ball core 40 is securely positioned within the cavity of an injection mold by engaging two or more retractable sleeves 36 against the core 40. A thermoplastic or thermosetting material for forming a cover or intermediate layer of a golf ball is injected into the mold cavity through a runner 33 and 34 and gate 35 system. The material may be heated at least to its melting point in a reservoir and then forced by a screw through the runner and gate system, preferably at about 12,000 psi. Injection of material preferably is initiated only after the retractable sleeves 36 have engaged with the golf ball core 40 to hold the core securely in position. The injected material will fill the void between the golf ball core 40 and the inner wall of the mold cavity to create a cover layer or intermediate layer of a golf ball. Preferably, no extra cover material is injected into the mold cavity beyond that necessary to fill the mold when it is closed. Thus, flow of injected material may be positively stopped after the mold cavity is filled.

The viscosity of the injected material will increase as it cools and hardens within the mold cavity. As shown in FIG. 6, the retractable sleeves 36 may disengage from the ball core 40 at any time once the injected material is sufficiently viscous and firm to support the ball core 40, i.e., once the injected material has surrounded the ball core 40 sufficiently to prevent the core from drifting out of position. Thus, the retractable sleeves 36 may disengage from the core 40 before being contacted by the injected material. Alternatively, the retractable sleeves 36 may remain engaged with the ball core 40 until the injected material surrounds the sleeve. Before the injected material surrounding the sleeve 36 hardens, however, the sleeve is disengaged from the ball core 40 and the remainder of the mold cavity fills evenly with injected material. While it also is possible to disengage the retractable sleeves 36 from the golf ball core 40 at a time when the sleeves are only partially surrounded by the injected material, disengaging the sleeves under such conditions may result in the terminus of flow not being located at the upper and lower poles of the ball. In the preferred embodiment having two retractable sleeves 36 located near the upper and lower poles of the mold cavity with a vent pin 37 within an inner cavity of each retractable sleeve, maintaining the retractable sleeves 36 engaged with the ball core 40 until surrounded with injected material will permit the flow terminus to meet near the poles of the ball where the vent pins are located.

After filling the mold cavity, the injected material hardens and the mold plates 31 and 32 are opened in order to remove the ball. In order to eject the ball from the mold cavity, the retractable sleeves 36 are activated to strike the surface of the ball, thereby causing the ball to be released from the mold cavity plates 31 and 32. One of ordinary skill in the art would understand that the amount, of impact force required to eject the ball from the mold cavity depends upon the existence and degree of at least the following three forces: undercut forces, adhesive forces, and vacuum forces. Because a retractable sleeve distributes the impact force required for ejecting the ball over a greater surface area than provided by retractable pins, a ball with a newly molded layer may be ejected from the mold with a retractable sleeve after a shortened hardening period, i.e., after the injected material has only partially hardened, while ejecting the same ball with retractable pins may cause the molded layer to be deformed, cracked or torn. Decreasing the allotted time for the molded layer to harden will permit for higher volume production rates than could be achieved with retractable pin injection molding.

It is to be understood that the above description and drawings are illustrative only, and that one of ordinary skill in the art can envision numerous variations and modifications in the disclosed retractable sleeves without departing from the invention. It will be understood that the following claims are intended to cover all such variations and modifications that come within the spirit and scope of the present invention.

What is claimed is:

1. An injection mold for producing golf balls, comprising:
    (a) A first mold plate defining a first cavity having a substantially hemispherical inner surface terminating in a first parting line surface;
    (b) a second mold plate defining a second cavity having a substantially hemispherical inner surface terminating in a second parting line surface, wherein each said mold plates has a mating surface for mating with each other along a predetermined plane, and together defining a substantially spherical mold cavity when said mating surfaces are mated; and
    (c) two retractable sleeves that extend from the inner surface of the first and second mold cavities to the outer surface of a golf ball core to hold the core substantially in the center of the spherical mold cavity.

2. The injection mold of claim 1 wherein said retractable sleeves are located substantially at the upper and lower poles of the first and second mold cavities.

3. The injection mold of claim 2 wherein said retractable sleeves surround a first and second vent pin located near the upper and lower poles of the first and second mold cavities.

4. The injection mold of claim 1 wherein the surfaces of said first and second mold plates defining said first and second mold cavities are textured to form a negative dimple pattern with a plurality of protrusions that form dimples in a finished golf ball cover.

5. The injection mold of claim 4 further comprising a first and second vent pin located near the upper and lower poles of the mold cavity, wherein said retractable sleeves have end surfaces that are shaped to conform to the negative dimple pattern of the mold cavity.

6. The injection mold of claim 5 wherein the perimeter of the retractable sleeve does not intersect with a dimple.

7. The injection mold of claim 1 wherein the retractable sleeves are shaped to securely position said golf ball core when said sleeves are engaged against said golf ball core, and essentially conform to the curvature and texture of the mold cavity wall when disengaged.

8. The injection mold of claim 7 wherein the retractable sleeves have a profile angle between about 10 to about 30 degrees.

9. The injection mold of claim 8 wherein the retractable sleeves have a profile angle of about 20 degrees.

10. The injection mold of claim 1 wherein the retractable sleeves have an essentially circular cross section.

11. The injection mold of claim 1 wherein the distance from the center of the retractable sleeve to its outermost edge is from about 15 percent of the diameter of the ball to about half of the diameter of the ball.

12. The injection mold of claim 11 wherein the distance from the center of the retractable sleeve to its outermost edge is about it 35 percent of the diameter of the ball.

13. A method of manufacturing a golf ball layer utilizing a retractable sleeve comprising the steps of:
    (a) placing a golf ball core within a golf ball mold cavity;

(b) positioning said golf ball core within said mold cavity with at least two retractable sleeves extending from an inner surface of said mold cavity and into supporting relationship with said golf ball core to center the core within the mold cavity; and (c) injecting a layer material into the mold cavity about said golf ball core.

14. The method of claim 13 further comprising disengaging the retractable sleeves from the golf ball core prior to being contacted by the injected material.

15. The method of claim 13 further comprising disengaging the retractable sleeves from the golf ball core once the injected material fully surrounds the retractable sleeves.

16. The method of claim 13 further comprising venting trapped air and gasses within the golf ball mold cavity through vent pins located near the upper and lower poles of the mold cavity.

17. The method of claim 13 wherein the step of positioning said golf ball core within said golf ball mold cavity occurs before injected material enters the golf ball mold cavity.

18. The method of claim 13 further comprising the step of ejecting the golf ball from the mold by striking the ball with at least one retractable sleeve after the injected material has at least partially hardened.

19. The method of claim 13 further comprising ejecting the golf ball from the mold after the injected material has substantially hardened.

* * * * *